United States Patent [19]

Lakin

[11] 4,418,670

[45] Dec. 6, 1983

[54] FUEL INJECTION PUMPING APPARATUS

[75] Inventor: David F. Lakin, London, England

[73] Assignee: Lucas Industries Limited, Birmingham, England

[21] Appl. No.: 301,019

[22] Filed: Sep. 10, 1981

[30] Foreign Application Priority Data

Oct. 10, 1980 [GB] United Kingdom ............... 8032778

[51] Int. Cl.³ ............................................. F02D 1/02
[52] U.S. Cl. ................................... 123/446; 123/506
[58] Field of Search ............ 123/446, 447, 497, 498, 123/506

[56] References Cited

U.S. PATENT DOCUMENTS

| 4,019,481 | 4/1977 | Lakra | 123/447 |
| 4,082,481 | 4/1978 | Fenng | 123/447 |
| 4,091,784 | 5/1978 | Seilly et al. | 123/447 |
| 4,173,208 | 11/1979 | Fenne et al. | 123/447 |
| 4,184,459 | 1/1980 | Ishii et al. | 123/497 |
| 4,216,754 | 8/1980 | Lakra | 123/447 |
| 4,297,982 | 11/1981 | Lakra | 123/446 |
| 4,325,340 | 4/1982 | O'Neill | 123/447 |

Primary Examiner—Charles J. Myhre
Assistant Examiner—Magdalen Moy

[57] ABSTRACT

A fuel injection pumping apparatus comprises piston means slidable in a bore from one end of which extends a fuel outlet for connection to a nozzle. A fuel inlet is connected to the one end of the bore and a valve controls flow through the inlet into the bore. The piston means is actuated by liquid under pressure supplied by a plunger actuated by an engine driven cam located in a cylinder. A two way valve is provided to control flow of liquid from the cylinder either to the bore or to a source of liquid, the valve being controlled by an electrically operated actuator. The actuator is controlled by a control circuit which receives a signal from a transducer associated with the piston means.

3 Claims, 4 Drawing Figures

FUEL INJECTION PUMPING APPARATUS

This invention relates to a fuel injection pumping apparatus for supplying fuel to an injection nozzle of an internal combustion engine and of the kind comprising a piston means contained within a bore, an outlet from one end of the bore, said outlet in use communicating with an inlet of the nozzle, a fuel inlet to said one end of the bore connected in use to a source of fuel under pressure, a valve operable to prevent flow of fuel through said inlet during delivery of fuel through said outlet, a reciprocable plunger contained within a cylinder, engine operated cam means for urging the plunger towards one end of the cylinder, passage means connecting said one end of the cylinder with the other end of said bore whereby liquid displaced during movement of the plunger by the cam will act on said piston means to urge the piston means to displace fuel through said outlet.

One example of such an apparatus is shown in the specification of British Pat. No. 861,754. In this case the delivery of fuel through the outlet always occurs at the same position of the cam, irrespective of the speed of the associated engine and the quantity of fuel being supplied thereto. Moreover, the control of the amount of fuel supplied by the system is effected using a variable orifice through which fuel passes to the inlet of the bore. The means for inducing the flow of fuel into the bore is a spring which acts on the piston means. Adjustment of the timing of delivery of fuel is necessary in order to achieve correct operation of the associated engine and the method of controlling the amount of fuel supply described in the aforesaid specification has disadvantages when the associated engine has a wide speed range.

A modification of the apparatus is shown in the specification of British Pat. No. 1,306,422. In this case an electromagnetic valve is provided to allow liquid to escape from between the plunger and piston means as the plunger is moved by the cam. This enables the timing of delivery of fuel to be adjusted. Moreover, there is also provided a solenoid operated valve which controls the amount of fuel supplied to the bore. The control of the maximum fuel which can be delivered to the engine is effected by an adjustable stop which limits by its engagement with the piston, the maximum movement of the piston. The stop is adjustable by means of a rotary solenoid.

The system shown in specification No. 1,306,422 has important advantages over the system shown in No. 861,754 in that it is possible to provide electronic control. There is however no indication of the amount of fuel being supplied to the engine and the system requires three solenoid operated devices to provide the required degree of control.

The object of the present invention is to provide an apparatus of the kind specified in an improved form in which improved control of the quantity of fuel supplied by the apparatus is obtained using a solenoid operated valve with the same valve being utilised to enable variation of the timing of delivery of fuel to be obtained.

According to the invention an apparatus of the kind specified comprises a solenoid controlled two way valve operable to permit liquid flow in one position between the bore and the cylinder and in the other position between the cylinder and a source of liquid, a transducer for providing a signal indicative of the position of said piston means and a control circuit for controlling the operation of said valve whereby in use, during inward movement of the plunger by the cam the valve is moved to said one position when delivery of fuel is required and is returned to the other position after said piston means has moved a predetermined extent during the time when the plunger is allowed to move outwardly by the cam.

An example of an apparatus in accordance with the invention will now be described with reference to the accompanying drawings in which.

Figure 1:
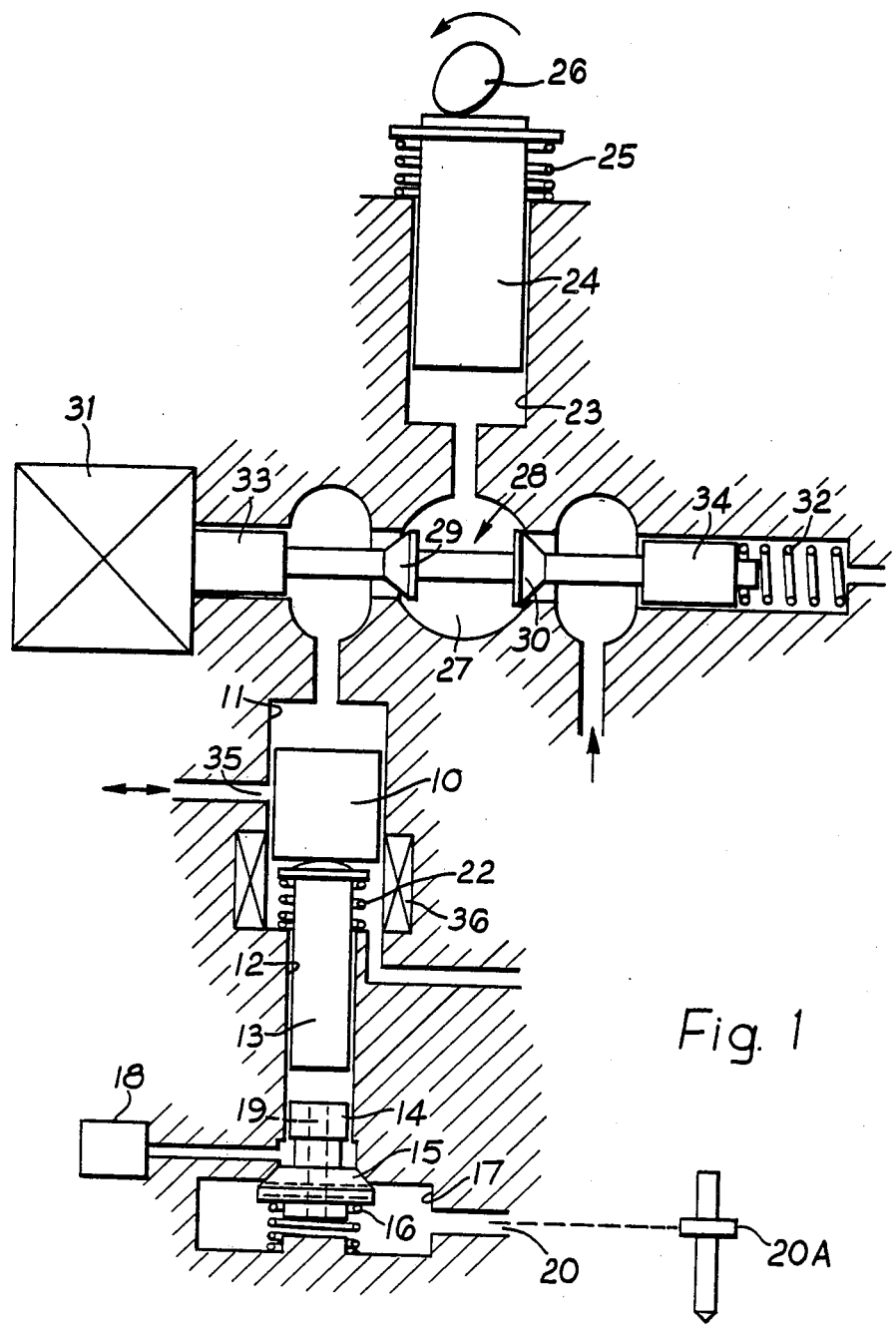
FIG. 1 is a diagrammatic representation of the apparatus.

Referring to FIG. 1 of the drawings piston 10 is located in a bore 11 the latter having a reduced portion 12 in which is located a further piston 13 engageable by the piston 10. Moreover, located in the bore 12 is a valve body 14 which is provided with a head 15 which is of larger diameter than the main portion of the valve body. The head 15 is urged by means of a coiled compression spring 16 into engagement with a seating defined at the junction of the portion 12 of the bore and a further enlarged portion 17. An annular space is defined between the valve body 14 and the bore 12 and this space is in constant communication with a source 18 of fuel under pressure. Formed in the valve body is a longitudinal passage 19 which communicates with an outlet 20 connected in use, to an inlet of the associated fuel injection nozzle 20A. A coiled compression spring 22 is provided to bias the pistons 10 and 13 away from the valve body, and the annular space defined between the piston 13 and the bore 11 is connected to the aforesaid source 18 of fuel.

Also provided is a cylinder 33 in which is slidably located a pumping plunger 24. The pumping plunger is biassed by means of a spring 25 towards a rotary cam 26 which in use is driven in timed relationship with the associated engine. The cylinder 23 communicates with a valve chamber 27 in which is slidably located a movable valve member 28 having oppositely disposed valve heads 29, 30 which are shaped for co-operation with seatings defined in the valve chamber. The valve member is so dimensioned that when one of the heads is in contact with its associated seating, the other head is spaced from its seating to permit flow of fuel past the head and seating. The valve member is actuated by an electromagnetic device 31 in conjunction with a spring 32 the latter acting to urge the head 29 into contact with its seating. When the device 31 is energised therefore the valve member 28 moves so that the head 30 engages its seating. The valve head 29 controls communication between the valve chamber 27 and the bore 11 whilst the valve head 30 controls communication between the valve chamber 27 and a source of fuel conveniently the aforesaid source 18. The valve member is provided with pressure balancing pistons 33, 34 which are subjected to the pressure in the bore 11 and the pressure of the source 18 respectively.

The sequence of operation will now be described starting from the position of the various parts seen in FIG. 1. As shown, the plunger 24 is being moved against the action of the spring 25 by the cam 26. Fuel is therefore being displaced from the cylinder 23 to the valve chamber. The valve 28 is shown in the position in which the head 30 is in contact with its seating and therefore the fuel displaced from the cylinder 23 is supplied to the bore 11. The fuel under pressure is acting upon the piston 10 to move same downwardly and in so doing the piston 13 is also being moved downwardly to displace fuel from the bore 12 through the passage 19 to the output 20. This process will continue until the piston 13 engages the valve body 14 and when this occurs the head 15 is lifted from its seating thereby placing the bore 12 in communication with the source 18. The effect of this is to lower the pressure at the outlet 20 to permit closure of the valve member of the associated nozzle. Injection of fuel to the associated engine is therefore terminated and the surplus fuel which is displaced from the bore 12 is returned to the source 18. Movement of the pistons 10 and 13 continues until a spill port 35 formed in the wall of the bore 11, is uncovered by the piston 10. When this occurs no further movement of the pistons 10 and 13 can take place however, continued inward movement of the plunger 24 does displace fuel through the port 35.

As the cam 26 continues to rotate the plunger 24 will be permitted to move outwardly and will do so under the action of the spring 25. There will therefore be a reduction in the pressure in the valve chamber 27. Moreover, fuel will flow from the source 18 into the bore 12 to cause in conjunction with the spring 22, movement of the pistons 13 and 10 in a direction away from the valve body 14. The valve head 15 will remain away from its seating due to the pressure of fuel from the source 18. The movement of the pistons 10 and 13 is monitored by a transducer indicated at 36, and when the signal obtained from the transducer indicates that the required quantity of fuel has flowed into the bore 12, the solenoid device 31 is de-energised and under the action of the spring 32, the valve member 28 moves so that the head 29 contacts its seating. This prevents further movement of the pistons 10 and 13 and the valve head 15 now that the fluid pressures acting on the valve body and head are the same, closes onto its seating under the action of the spring 16. The pumping plunger 24 continues to maintain contact with the cam 26 by virtue of the spring 25 and by virtue of the pressure of fuel which is now supplied to the valve chamber 27 from the source 18.

As the cam continues to rotate the plunger 24 will be moved against the action of the spring 25 and fuel will be displaced from the cylinder 23 and returned to the source. When injection of fuel is required the solenoid device 31 is energised and the valve head 29 moves away from its seating whilst the valve head 30 moves into contact with its seating and the fuel leaving the cylinder 23 is supplied to the bore 11 to effect displacement of the pistons 10 and 13 as described.

With the arrangement described the pistons 10 and 13 are positively locked against movement until delivery of fuel is required and the risk of movement of the pistons 10, 13 during the process of operating the solenoid device 31 is minimised in view of the fact that the pressure in the valve chamber 27 will not fall below that of the source 18. Hence the system provides accurate control of the quantity of fuel supplied to the engine and it also provides for variation in the timing of delivery of fuel to the engine. In addition, the solenoid device 31 is energised for a single period only during one complete cycle of operation of the system.

Figure 2:
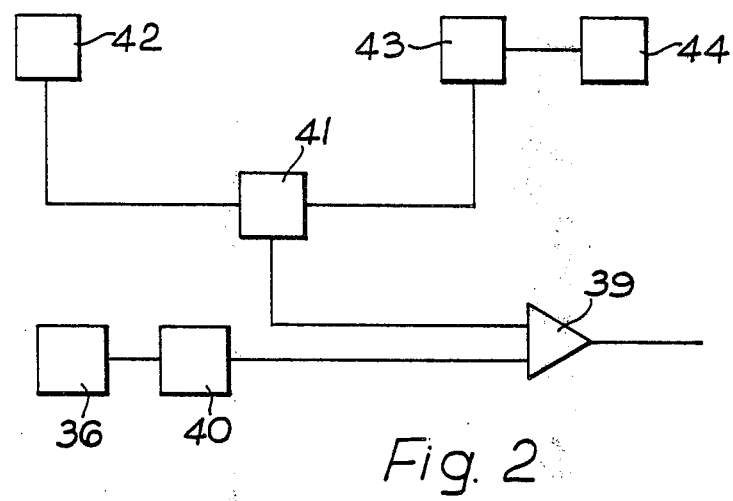
FIGS. 2, 3, 4 are block diagrams of the electronic control system for the apparatus of FIG. 1.
Figure 3:
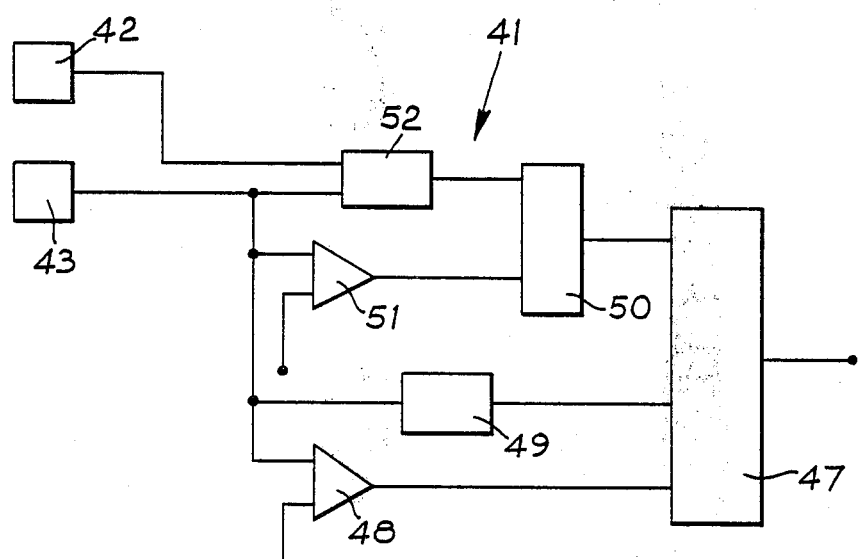
Figure 4:
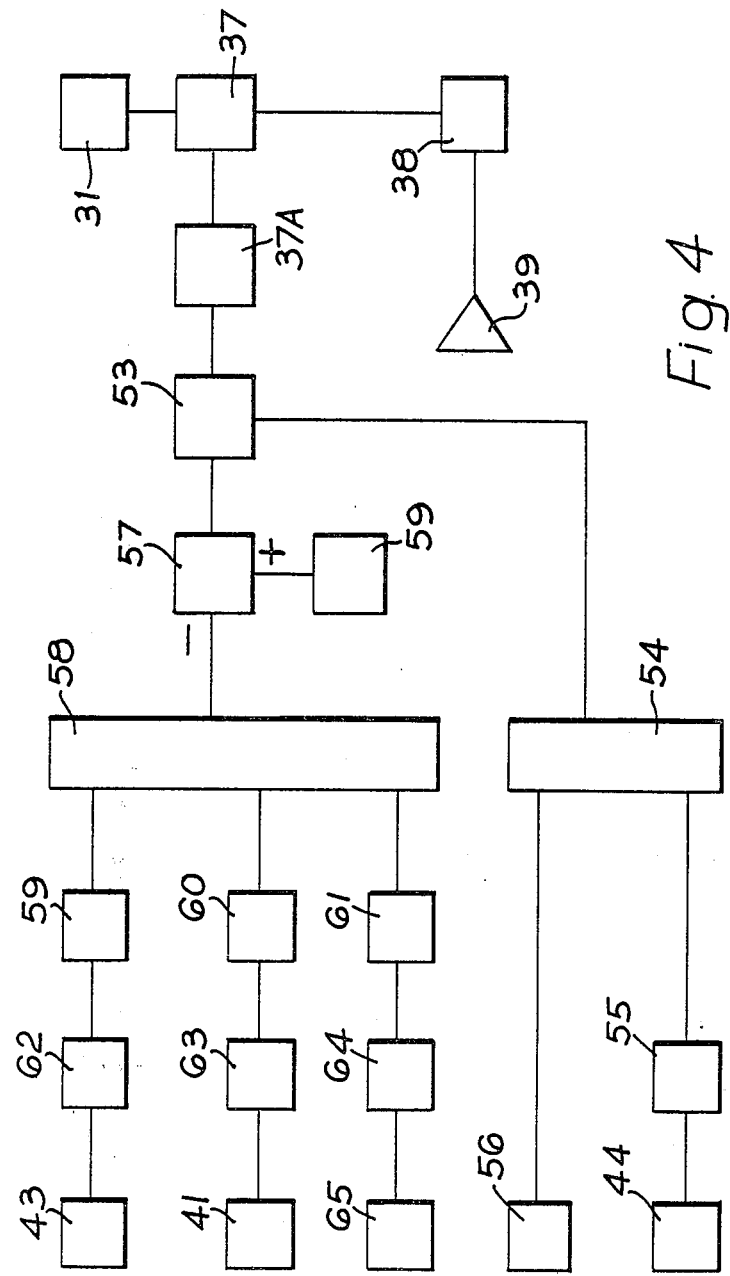

Turning now to FIGS. 2 and 4 of the drawings there is shown the control circuit which is utilised to control the operation of the solenoid device 31. Forming part of the circuit is a drive circuit 37 for the solenoid device and the drive circuit is switched on to energise the solenoid device 31 by means of a pulse from a monostable circuit 37A and is switched off by a pulse from a further monostable circuit 38. The drive circuit operates in a latch fashion that is to say it will remain on until turned off and vice-versa. The circuit 38 is controlled by a comparator 39 which compares the actual fuel signal supplied by the transducer 36 by way of a buffer circuit 40, with the required fuel signal supplied by a governor circuit 41. The governor circuit receives from a transducer 42 an operator demand signal, and also an engine speed signal from a buffer circuit 43 which is supplied with pulses at regular and predetermined intervals of rotation of a rotary part of the engine by means of a transducer 44. An example of the governor circuit 41 is seen in FIG. 3.

The governor circuit of FIG. 3 provides a two speed governing effect and includes a lowest wins circuit 47 the output of which constitutes the fuel demand signal. The circuit 47 has three inputs the lowest of which is selected by the circuit for supply as the fuel demand signal.

One input of the circuit 47 is connected to the output of a high gain amplifier 48 provided with feedback. One input of the amplifier is provided with a reference signal representative of the maximum allowed engine speed whilst the other input is supplied with the actual engine speed signal from the circuit 43.

The second input of the circuit 47 is connected to a circuit 49 which also receives the speed signal and provides a signal representing the maximum fuel signal throughout the speed range of the engine.

The third input of the circuit 47 is connected to the output of a high wins circuit 50 which has two inputs. The first input is connected to the output of a high gain amplifier 51 provided with feedback and having two inputs one of which receives a reference signal representing the desired engine idling speed and the other of which receives the engine speed signal. The second input of the circuit 50 is connected to the output of a shaping circuit 52 which receives the engine speed signal and also a signal from the transducer 42.

In operation at engine idling speeds the amplifier 51 is operative to determine the demanded fuel signal at the output of the circuit 47 since with no demand on the part of the operator, the output from the amplifier will be larger than the output from the shaping circuit 52 but smaller than the output of the circuit 49 and the amplifier 48. When the operator places a demand on the engine by depressing the throttle pedal, then the output of the shaping circuit becomes higher than the output of the amplifier. If only a small demand is made then the signal from the circuit 50 will still be lower than those provided by the circuit 49 and the amplifier 48. Hence the driver will control directly the amount of fuel supplied to the engine and with an increased flow of fuel the engine will accelerate. If the operator makes a large demand on the engine then it is likely that the output of the circuit 50 will be greater than the output of the circuit 49 in which case the rate of fuel supply will be controlled by the circuit 49 until the output of the circuit 50 becomes smaller thereby restoring the control of the fuel supply to the operator. If the maximum allowed engine speed is attained then the output of the amplifier 48 becomes less and the fuel supply to the engine will be reduced to control the speed of the engine. The shaping circuit 52 is arranged to modify the apparent demanded fuel in accordance with increases in the engine speed to provide feedback to the operator of the engine. Furthermore, the idling speed may be modified in accordance with variation in low fuel demand on the part of the operator. This provides a smooth transition from the control by the amplifier 51 to the control by the circuit 52 and eliminates "lost motion" in the operator adjustable control.

The governor circuit may be modified in many ways to provide for example, a change in the idling speed with engine temperature, modification of the maximum fuel delivery in accordance with the ambient air pressure and or temperature, modification of the maximum fuel delivery with the pressure in the air inlet manifold of the engine, additional fuel for starting the engine when cold and modification of the fuel lever for starting when the engine is hot.

It will be understood that the circuit of FIG. 3 may be replaced by an all speed governor circuit or an isochronous governor circuit.

The monostable circuit 37A is controlled by a comparator 53 one input signal to which is supplied by a counter 54 which counts degrees of engine rotation from engine bottom dead centre. The counter has a count input connected to a generator 55 which receives pulses from the transducer 44. The counter is reset at bottom dead centre by means of a reset pulse provided by a transducer 56.

The other input to the comparator 53 is provided by a subtractor 57 which receives from an adder 58 a signal representing the required injection timing. This signal is subtracted in the subtractor 57 from a signal supplied by a circuit 59 representative of 180° so that the output of the subtractor is a coded signal representing the required injection timing after bottom dead centre.

In order to generate the required injection timing signal the adder 58 is supplied with signals from three read only memory circuits 59, 60, 61. These circuits are supplied with digital signals by respective analogue/digital converters 62, 63, 64, the converter 62 receiving a speed signal from the circuit 43, the converter 63 receiving the required fuel signal from the governor circuit 41 and the circuit 64 receiving an engine operating parameter signal for example a temperature signal, from a transducer 65.

The read only memory circuits 59, 60, 61, contain stored information which may be obtained as a result of engine testing, relative to the variation in the timing of delivery of fuel to the engine required for variations in the signals supplied to the circuits.

In operation, the required timing signal and the engine position signal are compared by the comparator 53 to energise the device 31 the device being de-energised by the signal from the comparator 39.

If pilot injection of fuel is required this may be effected by effecting initial energisation of the solenoid device 31 followed by de-energisation thereof and reenergisation to achieve the main injection of fuel.

The supply of fuel to the bore 13 from the source 18 during the filling period, is determined by the profile on the trailing flank of the cam. The filling period can therefore extend over a substantial number of degrees of rotation of the cam to thereby achieve very accurate metering.

In an alternative arrangement the annular space defined about the piston 13 and also the spill port 35 are connected to a drain and in this case the spring 22 need not be provided.

I claim:

1. A fuel injection pumping apparatus for supplying fuel to an injection nozzle of an internal combustion engine comprising piston means contained within a bore, an outlet from one end of the bore, said outlet in use communicating with an inlet of the nozzle, a fuel inlet to said one end of the bore connected in use to a source of fuel under pressure, a valve operable to prevent flow of fuel through said inlet during delivery of fuel through said outlet, a reciprocable plunger contained within a cylinder, engine operated cam means for urging the plunger towards one end of the cylinder, passage means connecting said one end of the cylinder with the other end of said bore whereby liquid displaced during movement of the plunger by the cam will act on said piston means to urge the piston means to displace fuel through said outlet, a solenoid controlled two-way valve operable to permit liquid flow in one position between the bore and the cylinder and in the other position between the cylinder and a source of liquid, a transducer for providing a signal indicative of the position of said piston means, and a control circuit for controlling the operation of said valve whereby in use, during inward movement of the plunger by the cam the valve is moved to said one position when delivery of fuel is required and is returned to the other position after said piston means has moved a predetermined extent during the time when the plunger is allowed to move outwardly by the cam, said two way valve comprising a valve chamber, first passage means connecting said valve chamber with said cylinder, a second passage means extending from said chamber and communicating with said bore, a third passage means extending from said chamber for connection to a source of liquid under pressure, first and second seatings disposed about said second and third passage means respectively, a valve member disposed in said chamber, said valve member mounting first and second valve heads for co-operation with said first and second seatings respectively, and pressure balancing pistons being exposed to the pressure in said bore and the pressure of liquid supplied from said source respectively.

2. An apparatus according to claim 1 including a spill port in the wall of said bore, said spill port being uncovered to allow escape of liquid from said bore at a predetermined position of said piston means during the movement of the piston means towards said one end of the bore.

3. An apparatus according to claim 1 including resilient means acting on said valve member in a direction to urge said first valve head into contact with said first seating.

* * * * *